F. G. BORG.
HINGE DEVICE FOR DOORS AND THE LIKE.
APPLICATION FILED JAN. 16, 1911.
1,000,707.
Patented Aug. 15, 1911.
4 SHEETS—SHEET 1.
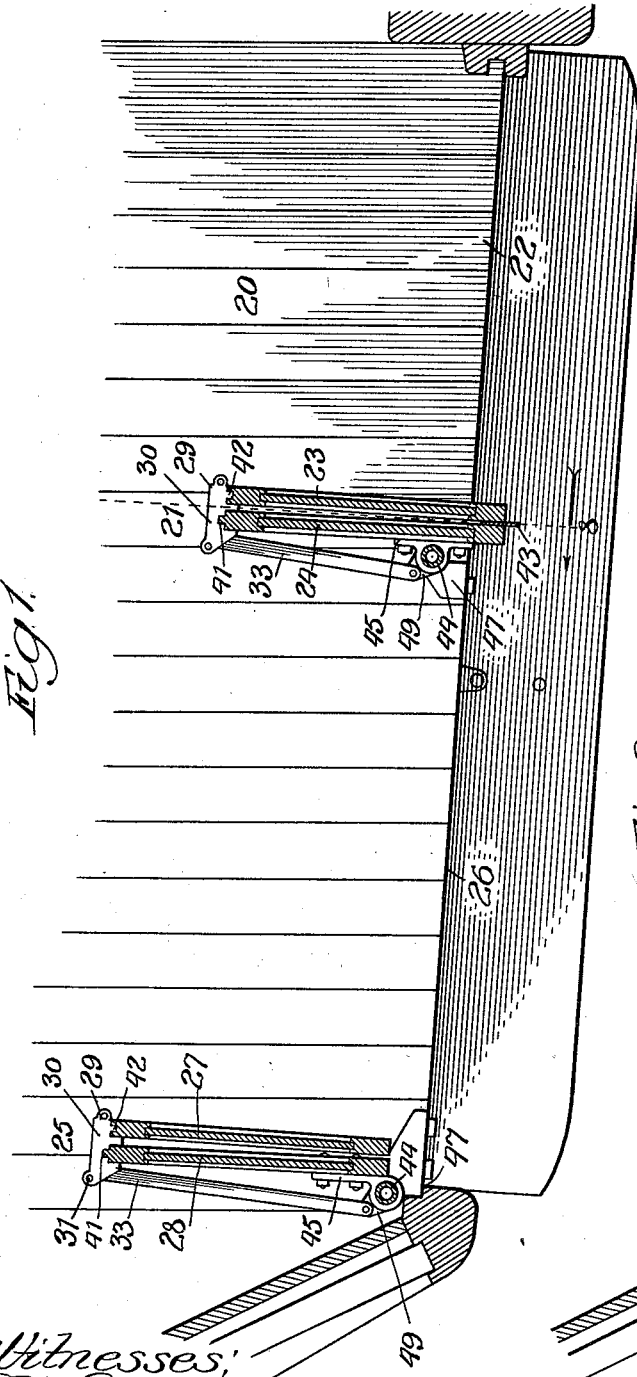
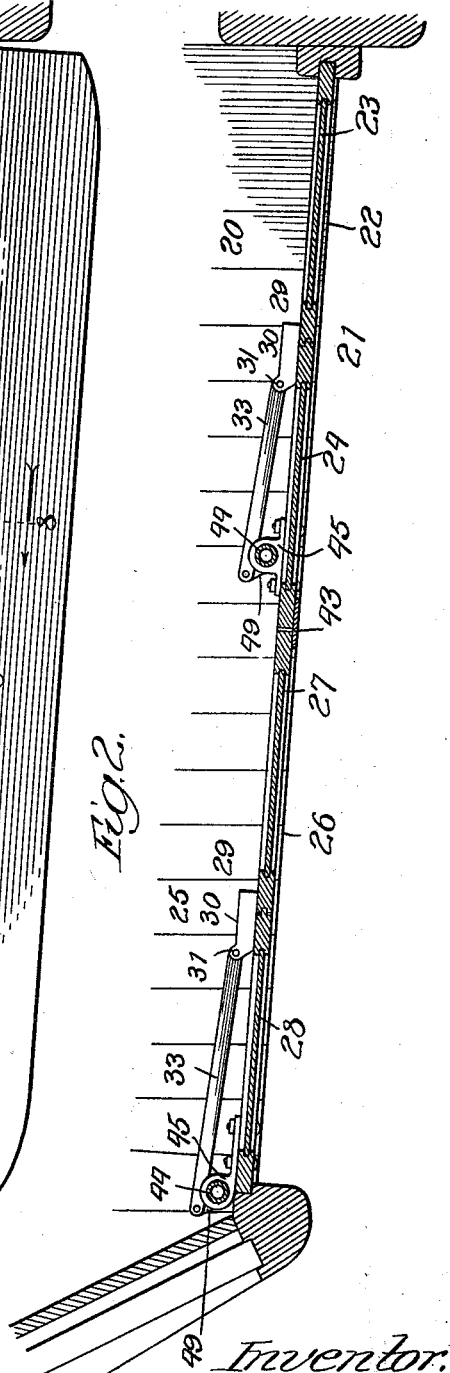

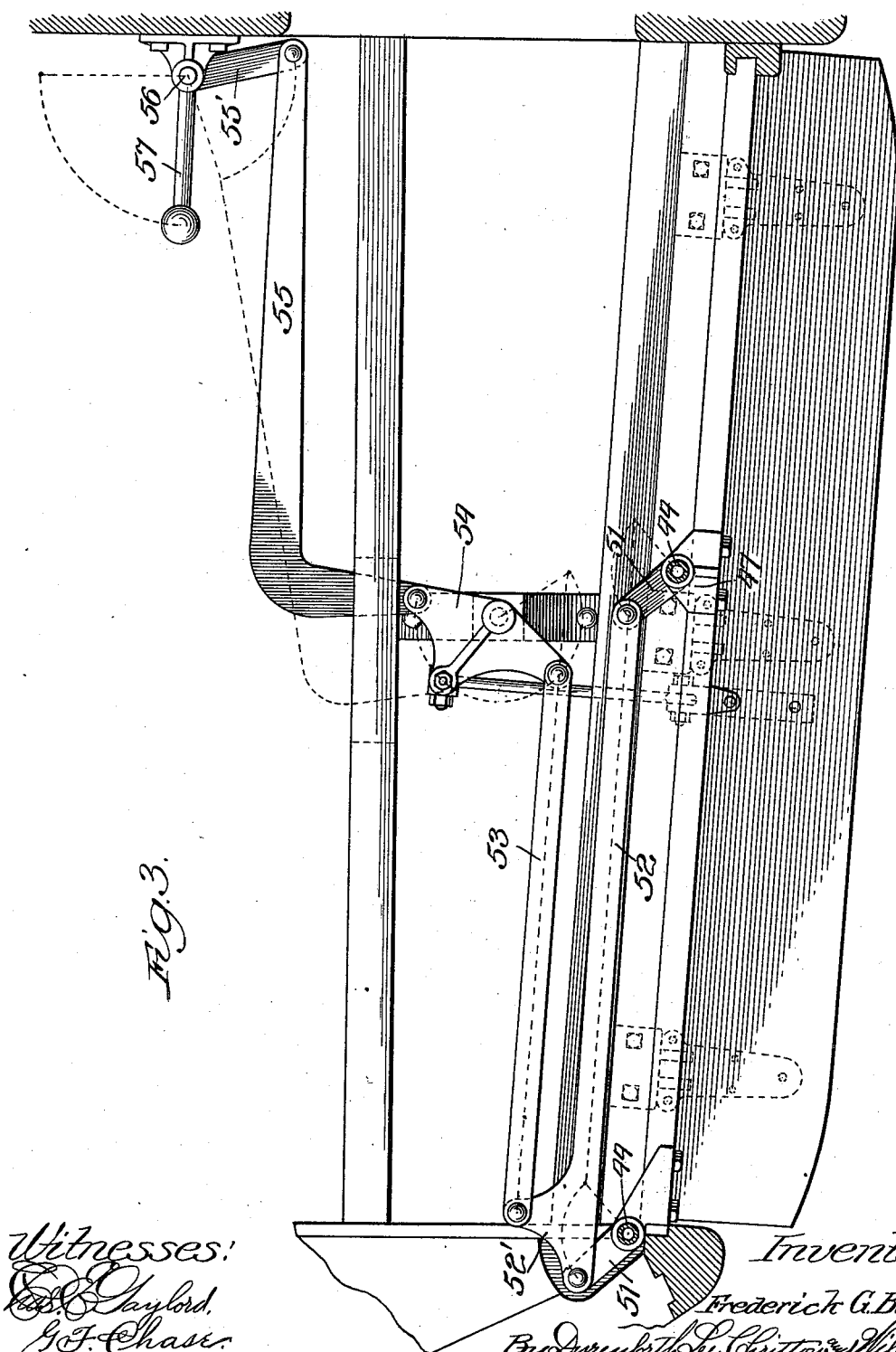

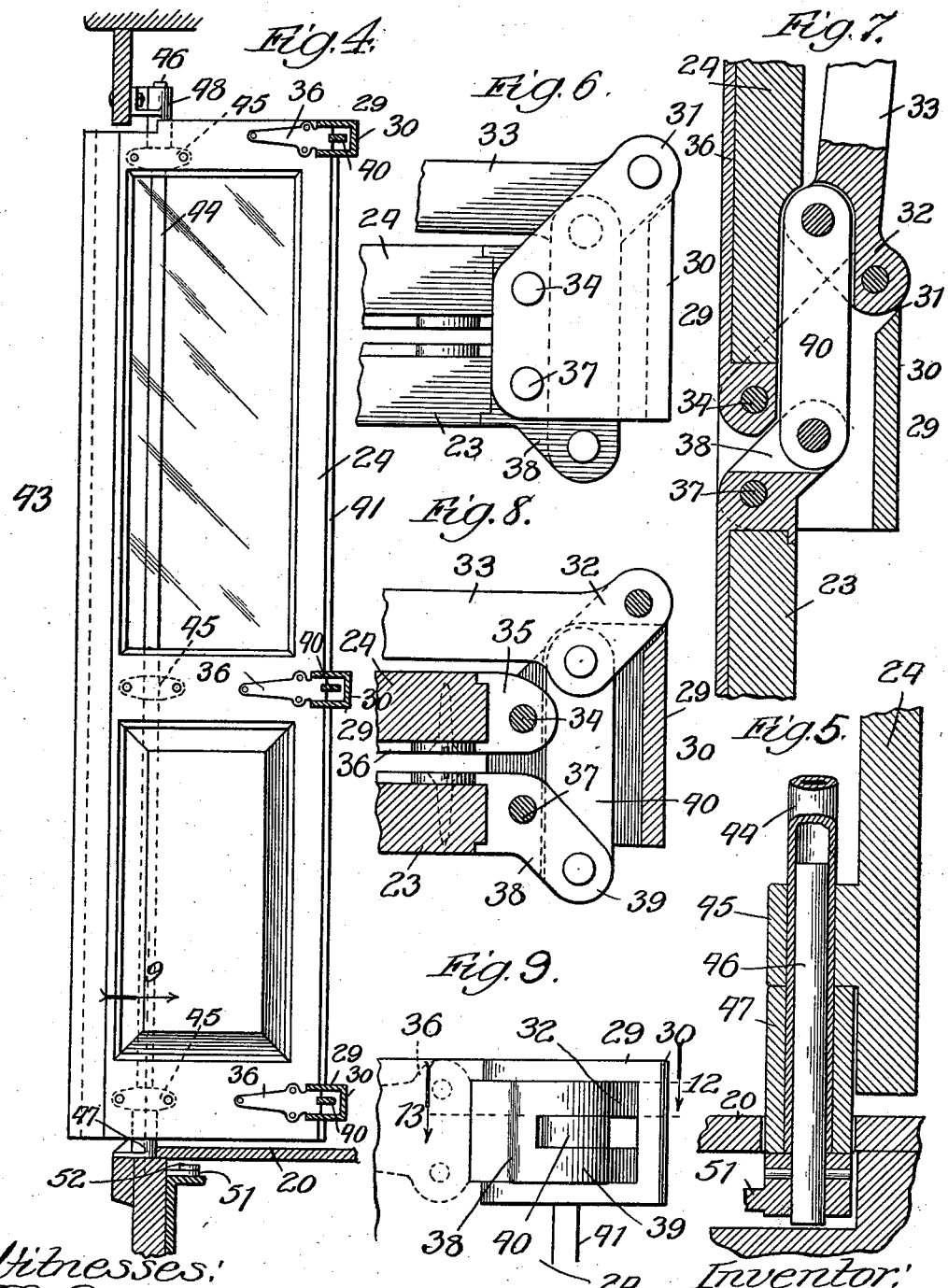

F. G. BORG.
HINGE DEVICE FOR DOORS AND THE LIKE.
APPLICATION FILED JAN. 16, 1911.
1,000,707.
Patented Aug. 15, 1911.
4 SHEETS—SHEET 4.
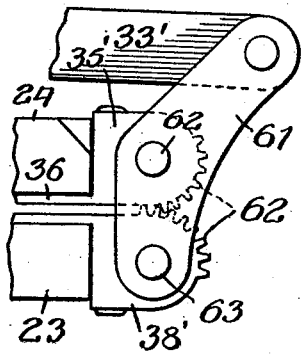
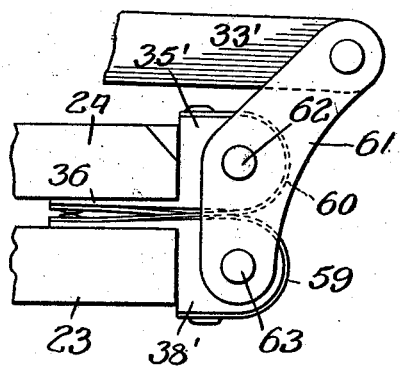
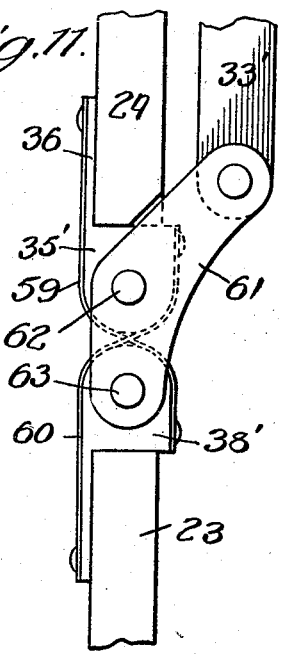
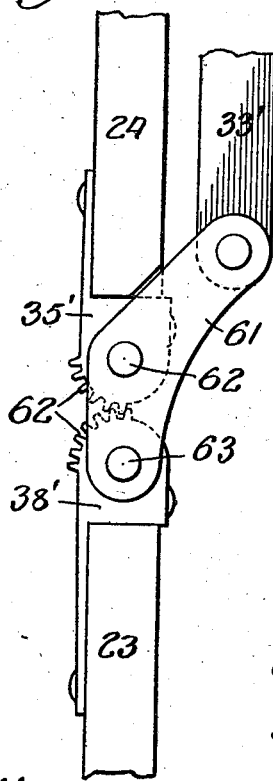
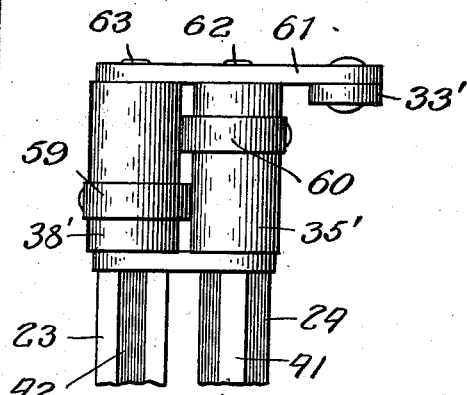
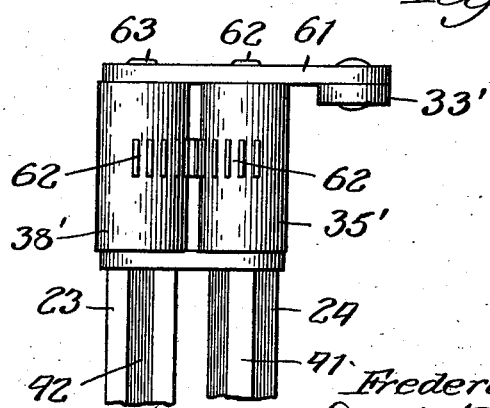
Witnesses:
Inventor:
Frederick G. Borg.

UNITED STATES PATENT OFFICE.

FREDERICK G. BORG, OF CHICAGO, ILLINOIS.

HINGE DEVICE FOR DOORS AND THE LIKE.

1,000,707.

Specification of Letters Patent. Patented Aug. 15, 1911.

Application filed January 16, 1911. Serial No. 602,800.

*To all whom it may concern:*

Be it known that I, FREDERICK G. BORG, a citizen of the United States, residing at Chicago, in the county of Cook and State of Illinois, have invented a new and useful Improvement in Hinge Devices for Doors and the Like, of which the following is a specification.

My invention relates to an improvement in the type of door, window, or the like comprising a plurality of members hinged together to adapt them to be folded and unfolded for opening and closing them.

While my invention is applicable to the objects named in various situations, I have more especially devised it for the doors of railway-cars and more immediately for doors on the platforms of street-railway cars of the pay-as-you-enter variety; and I therefore illustrate it in that particular application in the accompanying drawings and confine thereto the description hereinafter contained.

In the drawings, Figure 1 is a broken plan section showing part of one platform of a pay-as-you-enter street-railway car equipped with my improvement and representing the doors in their opened condition; Fig. 2 is a similar view of the same showing the doors in their closed condition; Fig. 3 is a plan section taken just below the platform-floor, showing the preferred operating mechanism for the hinged doors; Fig. 4 is a section on line 8, Fig. 1, showing one of the folded door-members in elevation; Fig. 5 is an enlarged broken section on line 9, Fig. 4; Fig. 6 is a plan view showing the preferred form of my improved hinge-device in its condition with the door members controlled by it in their folded relation; Fig. 7 is a horizontal section of the same showing the hinge-device in its condition with the door-members in their unfolded relation, and Fig. 8 is a similar section with the hinge-device in the condition represented in Fig. 6, the section being taken on line 12, Fig. 9, which last named figure shows the hinge-device in side elevation; Fig. 10 is a broken plan view showing a modified form of the hinge-device in its condition with the door-members controlled by it in their folded relation; Fig. 11 is a similar view of the same showing the hinge-device in its condition with the door-members in their unfolded relation, and Fig. 12 is a broken view of the same in elevation in the condition of the parts represented in Fig. 10; Figs. 13, 14 and 15 are views corresponding, respectively, with Figs. 10, 11 and 12, showing another modified form of the hinge-device.

It is desirable to provide each platform of a pay-as-you-enter car, which, like the platform shown at 20, is usually arranged with a forward exit-way 22 and a rear entrance-way 26 for passengers, who are thus obliged, in entering, to pass the conductor, with a door for each of said ways. The purpose is to have the doors, under the control of the conductor standing on the rear platform, closed while the car is in motion to then prevent the exit and entrance of passengers, and to permit such exit and entrance only when the car comes to a stop. To this end, I have applied my improvement in a manner to permit the doors to be simultaneously opened by folding the members inwardly and closed by unfolding them, all from a single point; and that application of my invention is illustrated in the drawings.

A door 21, for the exit-way 22, is composed of two similar hingedly-folding members 23 and 24, and a similar door 25, for the entrance-way 26, is likewise composed of the members 27 and 28. Description of the detailed construction of the door 21 will, therefore, suffice for both: At a plurality of points, as three (Fig. 4), the members 23 and 24 are connected at corresponding edges by similar hinge-devices 29. This device, in its preferred construction, comprises a metal housing 30 of general U-shape, having a perforated extension 31 on one end, in the nature of a crank-arm, in which is pivoted one end of a head 32 extending diagonally of an end of a tie-link 33. The housing is pivoted at 34 to a metal head 35, into which the edge of the door-member 24 is mortised, and which has a strap-extension 36 extending transversely of that member, to which it is screwed at a plurality of points. The housing has also pivoted in it, at 37, a metal head 38, into which the edge of the door-member 23 is mortised; and this head has a crank-like extension 39, which is connected by a link 40 with the other end of the head 32. For purposes hereinafter explained, the door-members are provided with a tongue 41 and a groove 42 on their respective hinged edges, and the member 24 of the door 21 carries a flap 43 projecting beyond the other, free edge.

A vertical rock-shaft 44, shown as a tube, is secured in brackets 45 fastened at intervals to the door-member 24 near its free edge. The tube is shown to have bearing-pins 46 driven into its ends, about which it is rotatably confined in sleeve-bearings 47 and 48 secured in proper positions to the frame-work of the car. From each bracket extends an arm 49 with which a tie-link is pivotally connected, thereby tying each hinge-device, from the crank-extension 31 of its housing 30, through the medium of a tie-link 33, to a stationary object (arm 49) eccentric to the axis 44.

As will be understood, the pivot at 34 not only connects one door-member with a housing 30 but also affords a pivot for the housing about which it is caused to turn, as and for the purpose presently to be explained.

By turning the shaft 44 in either direction it necessarily turns in that direction the door-member to which it is fastened, while turning the companion door-member in the opposite direction. To describe operating the door 21 with its members in the folded condition represented in Figs. 1, 6 and 8, turning the shaft 44 through a quarter-turn toward the right turns the member 24 to the closing position in which it is represented in Figs. 2 and 7, and in thus turning, the links 33 swing with it, but being fastened at 49, whereby they can not elongate, the movement of the member 24 causes the links to turn the housings of all of the hinge-devices on their pivots 34 with the effect of causing the links 40, by their connection with the bifurcated ends of the heads 32, to be pulled in the direction to cause them, by their connection with the bifurcated crank-ends of the heads 38, to turn the member 23 to the closing position, wherein the parts of each hinge-device are brought to the relative positions represented in Fig. 7. The hinged edges of the door-members are thus caused to meet, and as they come into alinement the tongue 41 on one enters the groove 42 in the other, to close them at their junctions; and the flap 43 laps the member 27 of the door 25, when similarly closed, to cover the space between the adjacent edges of the two members. Obviously, by turning the actuating rock-shaft in the opposite direction, the housings 30 will be turned on their pivots 34 to restore the parts of the hinge-devices to their relative positions represented in Fig. 8 to fold the door-members outwardly into the condition of the door 21 in Fig. 1.

While my invention is intended for application to a single door composed of two or more of the folding members, where the two doors illustrated, or more than two, are provided, as for closing a side of a car-platform, though each may be independently operative from its rock-shaft 44 or by manipulating a door-member, it is desirable to provide for operating them all simultaneously from a single point; and suitable means for that purpose are illustrated in the drawings, and fully in Fig. 3. To the lower end of each rock-shaft 44, on the projecting end of the pin 46 therein, is fastened (Fig. 5) a crank 51. A link 52 connected at one end with one crank 51 is provided on its opposite end with a head $52^1$ of general bell-crank shape, one arm of which is connected to the other crank 51; the other arm of this head is connected by a link 53 with one arm of a three-armed bell-crank 54, fulcrumed as shown, the opposite arm of which is connected by a bent link 55 with a crank $55^1$ on a vertical shaft 56 journaled in bearings in suitable position on the car-platform for convenient access by the conductor to an operating lever 57 on the shaft. Thus, with the parts in the relative positions of their full-line representation in Fig. 3, the doors are in the open condition as shown in Fig. 1, and by turning the lever 57 to bring the parts to the dotted positions, the doors are closed.

The construction described of my improved hinging device is believed to be the best embodiment of my invention. Another desirable embodiment thereof, however, is that illustrated in Figs. 10 to 12, inclusive. This construction omits a housing 30, and employs the heads $35^1$ and $38^1$ for attachment to the adjacent edges of the door-members 24 and 23, respectively, with flexible straps 59 and 60, of leather or other suitable material, crossing each other to cause the strap 59 to connect the head $38^1$ with the inner side of the door-member 24 and the strap 60 to similarly connect the head $35^1$ with the door-member 23. A curved link 61 is pivoted at 62 and 63, respectively, to the heads $35^1$ and $38^1$, and is pivotally connected with one end of a link $33^1$, the other end of which is similarly connected to a stationary object at 49, as in the first-described construction; whereby properly turning one member of a folded door, as through the medium of a rock-shaft 44 thereon and the described operating mechanism, will dispose the door-members from their folded condition represented in Fig. 10 to their closed condition, represented in Fig. 11, and so turning a member of the closed door will fold and thus open it.

Another desirable embodiment of my invention, which is illustrated in Figs. 13 to 15, inclusive, differs from that last described only in substituting for the straps 59 and 60 intermeshing gear-teeth 62 on the two heads $35^1$ and $38^1$, to cause movement of the link 61 in one direction to swing the door-members from one position, as that in which they are shown to be folded in Fig. 13, to their other position, as that shown in Fig. 14, wherein they are unfolded to close the door.

The described three embodiments of my invention may be amplified by other and further embodiments thereof without departure from the principle of my invention, which is that of a door, or the like, composed of folding members one of which is supported to swing on a fixed axis, with the members connected by a hinge-device comprising two heads, one on each of said members, coöperatively connected to adapt them to be turned toward and from each other, and thereby correspondingly swing said members, and a link connecting the hinge-device with a stationary point eccentric to said axis, whereby swinging a member on said axis will turn the heads of the hinge-device, and with them said members in relatively opposite directions. It is my intention to claim broadly herein as my invention the embodiment of the principle thus defined, as well as to claim the means I have devised for embodying it as broadly as may be warranted by the prior art.

I do not herein claim my invention in door-operating mechanism in connection with the stop-operating device, but claim the same in my divisional application Serial No. 613,894, filed March 11, 1911.

What I claim as new and desire to secure by Letters Patent is—

1. In combination with folding members, an axially-rotatable support to which one of said members is secured, a hinge-device comprising heads on said members, connected together to turn in relatively-opposite directions by turning one of the heads and correspondingly turn said members, and a link connecting said hinge-device with a stationary object eccentric to the axis of said support, for the purpose set forth.

2. In combination with folding members, an axially-rotatable support to which one of said members is secured, a hinge-device comprising heads on said members and link-actuated connections between said heads for turning them and said members in relatively-opposite directions by turning one of the heads, and a link connecting said hinge-device with a stationary object eccentric to the axis of said support, for the purpose set forth.

3. In combination with folding members, a vertical rotary shaft secured to one of said members, a hinge-device comprising heads on said members connected together to turn in relatively-opposite directions by turning one of the heads and correspondingly turn said members, a link connecting said hinge-device with a stationary point adjacent to said shaft, a crank on said shaft and lever-operated mechanism connected with said shaft for turning it, for the purpose set forth.

4. In combination, a plurality of doors each formed of folding members, vertical rotary shafts each secured to a member of a different door, hinge-devices on the doors, each comprising heads on adjacent door-members connected together to turn in relatively-opposite directions by turning one head and correspondingly turn said members, links connecting the hinge-devices with stationary points adjacent to said shafts, cranks on the shafts, and lever-operated mechanism connected with said cranks for simultaneously turning the shafts, for the purpose set forth.

5. In combination, a plurality of doors each formed of folding members tongued and grooved along their adjacent edges, vertical rotary shafts and each secured to a member of a different door, hinge-devices on the doors, each comprising heads on said edges connected together to turn in relatively-opposite directions by turning one head and correspondingly turn the hinged members, links connecting the hinge-devices with stationary points adjacent to said shafts, cranks on the shafts, and lever-operated mechanism connected with said cranks for simultaneously turning the shafts, for the purpose set forth.

6. In combination with folding members, an axially-rotatable support to which one of said members is secured, a hinge-device comprising heads on said members, a housing to which said heads are pivotally secured, a link connecting said housing with a stationary point eccentric to said support, and a second link connecting one of said heads with said first-named link, for the purpose set forth.

7. In combination with folding members, an axially-rotatable support to which one of said members is secured, a hinge-device comprising heads on said members, one of said heads having a crank-extension, a housing to which said heads are pivotally secured and provided with a crank-extension, a headed link having its head pivotally connected with the crank-extension of said housing and its opposite end pivotally connected with a stationary point adjacent to said support, and a link connecting the crank extension of said one head with the head on said headed link, for the purpose set forth.

FREDERICK G. BORG.

In the presence of—
A. U. THORIEN,
R. A. SCHAEFER.

Copies of this patent may be obtained for five cents each, by addressing the "Commissioner of Patents, Washington, D. C."